March 12, 1935.  P. R. BRAUN  1,993,827
INDICATOR ATTACHMENT FOR TAXI METERS
Filed Feb. 26, 1934   2 Sheets-Sheet 1

Inventor
P. R. Braun
By Clarence A. O'Brien
Attorney

March 12, 1935.  P. R. BRAUN  1,993,827
INDICATOR ATTACHMENT FOR TAXI METERS
Filed Feb. 26, 1934  2 Sheets-Sheet 2
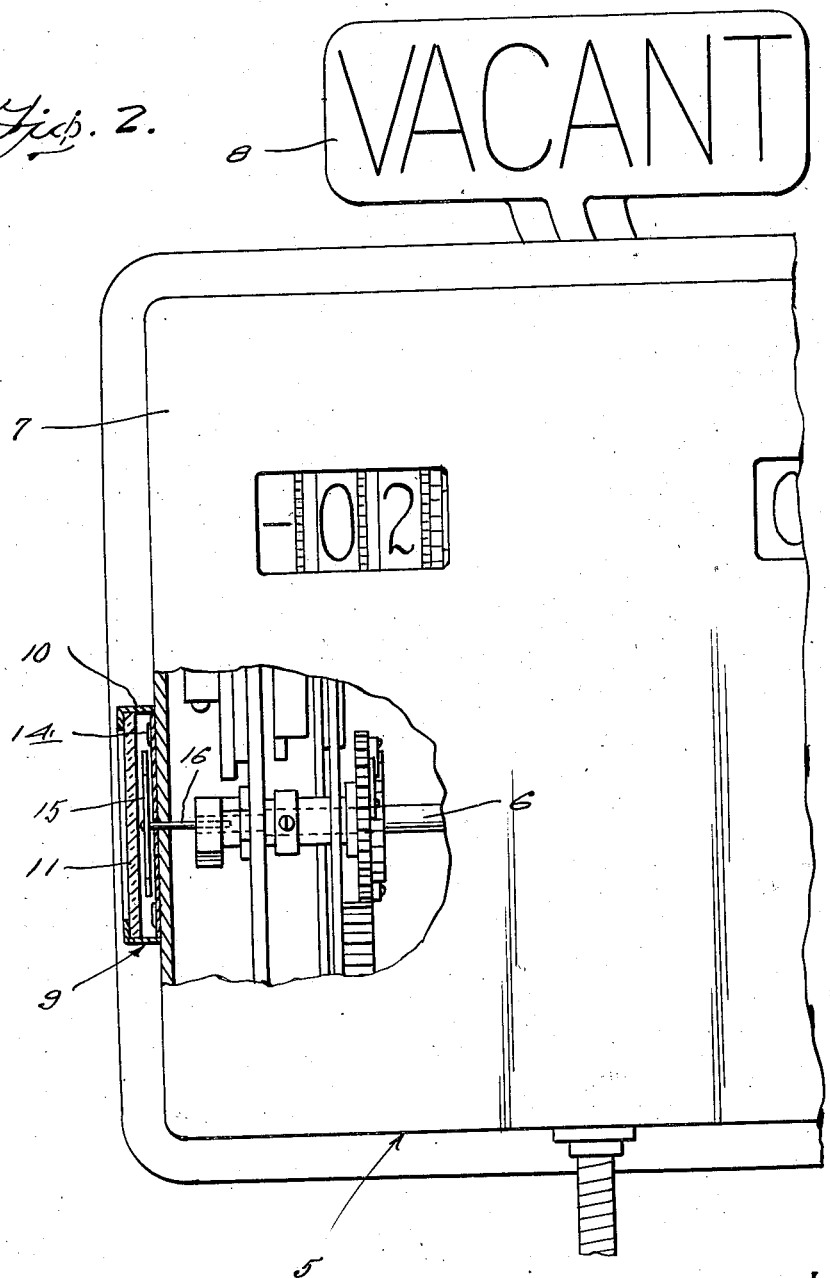
Inventor
P. R. Braun
By Clarence A. O'Brien
Attorney Patented Mar. 12, 1935

1,993,827

UNITED STATES PATENT OFFICE 1,993,827

INDICATOR ATTACHMENT FOR TAXI METERS

Paul Richard Braun, Brooklyn, N. Y.

Application February 26, 1934, Serial No. 713,041

2 Claims. (Cl. 116—129)

This invention relates to fare registering taxi meters of the type used on cabs or other vehicles for hire.

The object of the invention is to provide a simple and practical indicator for ready application to taxi meters now in use, and especially for application to that type of meter which involves the subject matter of Patent No. 1,762,862 granted to Julius Gluck under date of June 10, 1930.

Briefly the invention consists in the provision of an attachment in the form of a clock including a dial or clock face over which is movable a hand or pointer together with means for bringing the hand or pointer in driving engagement with the main shaft of the taxi meter so that by glancing at the indicator one will be able to determine whether or not the taxi meter is in proper working order.

The invention also has as an object thereof to provide an auxiliary indicator of the character above mentioned which will serve as the means whereby the driver of the taxi will be able to tell at a glance whether his meter is in working condition or not.

Another object is to provide a device of the class stated which will be efficient in service insofar as it will form a check for the driver so that he will be able to tell whether he is running on a time or a mileage basis.

The invention together with its objects and advantages will be best understood from a study of the following description taken in connection with the accompanying drawings wherein:

Figure 2 is a fragmentary enlarged sectional view with certain parts broken away and more clearly illustrating the application of the invention.

Figure 1:
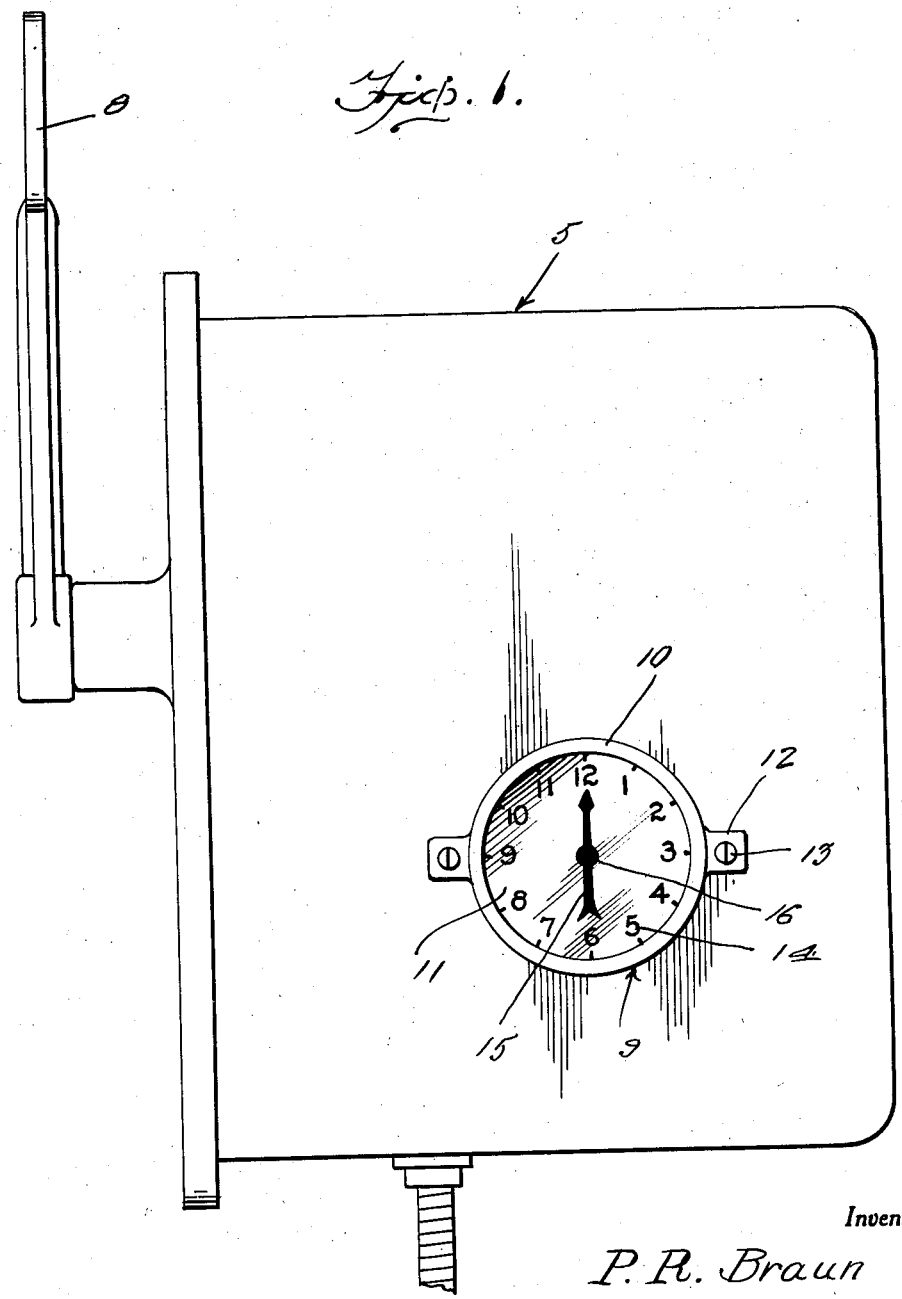
Figure 1 is a side elevational view of a taxi meter having the attachment applied thereto.

Referring more in detail to the drawings it will be seen that 5 indicates generally a taxi meter of a well known construction. Only such parts of the taxi meter will be specifically referred to as is deemed necessary for a thorough understanding of the invention. Thus, the main shaft of the taxi meter is indicated by the reference numeral 6 while the casing of the taxi meter is indicated generally by the reference numeral 7, and the flag by the reference numeral 8.

The attachment is indicated by the reference numeral 9 and in the present instance consists of a circular casing 10 that is provided on its front side with a sight window 11. Extending from diametrically opposite sides of the periphery of the casing 10 are flanges or attaching ears 12 which are apertured to accommodate screws or other fastening elements 13 for securing the casing on the box or casing 7 of the taxi meter.

Fitting within the casing and serving somewhat as a back wall therefor is a dial 14 that is in the nature of a clock face having on the side thereof viewable through the window 11 a scale graduated in terms of hours as shown.

Movable over the face of the dial 14 is a pointer, index or hand 15 and this hand is mounted on one end of a shaft 16 that extends through an opening suitably provided therefor centrally of the dial 14, an opening provided in the side wall of the taxi meter casing 7 nearest to the driver and terminating inwardly of the casing or housing 7 as clearly shown in Figure 2. To accommodate the inner end of the shaft 16 the adjacent end of the main shaft 6 of the taxi meter is provided with an axial socket and this socket may be square or non-circular in cross section while the end of the shaft 16 fitting in the socket may be of a corresponding cross section so as to provide a driving engagement of the shaft 16 with the main shaft to drive the pointer 15 in synchronism with the main shaft 6 of the taxi meter.

From the above it will be apparent that when the meter 5 is in use, and is in proper working order the shaft 6 will drive the shaft 16 for moving the pointer 15 in the path of the circle over the face of the dial 14. Under such conditions the taxi driver, by glancing at the attachment will know that he is working on a mileage basis. If for any reason the main drive shaft through some inadvertence should break or is not operating properly there will of course be no transmission of drive to the pointer 15 and under such conditions, when the driver glances at the auxiliary indicator he is apprised of the condition of the meter and may then inform his passenger that he is now charging on a time basis.

The utility and advantage of an invention of this character will be fully appreciated when consideration is given to the inconvenience caused to the users of taxi meters in that the taxi meters often go out of order during the running of same and the driver has great difficulty in arriving at the proper charge he should make to his passengers often resulting in friction between the passenger and the owner of the taxi. As is apparent this invention is designed to eliminate as far as possible such friction, and to assist the general public and taxi owners to work together in unison, by providing a simple and efficient indicator which when attached to a meter in the manner hereinbefore fully described will show at a glance whether the meter is in working condition so that the driver may at once arrange to carry his passenger on a time basis until the meter is repaired.

Another advantage gained in providing an auxiliary indicator of the character of this invention is that the same may be used as a testing device for the meter. Familiarity and continual use of the instrument will allow the driver and tester to judge whether the meter is recording correctly or not. This advantage is particularly useful where the hand is driven directly from the main drive shaft as illustrated herein, as it will notify the driver or tester that some part of the charge recording mechanism is out of order and requires adjustment. Also, when the taxi is at a standstill with the flag 8 down, the auxiliary indicator will show if the clock is working properly on waiting time. When the flag is put up the indicator is set in operation to automatically return the hand or index 15 to a position readable against the numeral 12 on the face of the dial.

In this connection it will be understood that if, for example, the meter is set to drop each one quarter mile, the indicator would be set that the handle pointer of the indicator will move into an indicating position with respect to the numeral 2 on the dial of the indicator at the first drop, then to the numeral 4 of the dial at the second drop and so on around the base of the dial. Therefore if the meter is registering too fast the drop will occur before the indicator 15 moves into proper registering position with respect to the numeral 2 on the base of the dial, or the numeral 4, or 6, etc., as the case may be. On the other hand if the meter is registering too slow, the drop will occur after the indicator has passed the numerals 2, 4, 6 or 8, etc., as the case may be. As will be understood, in case the meter is changed to run on different mileage say for example one-third or one-half mile, the numerals on the dial will be changed accordingly.

Having thus described my invention, what I claim as new is:

1. The combination with a taxi meter having a casing and a main shaft, of an indicator including a casing mounted on the casing of the taxi meter, a dial having a clock face mounted within the casing of the indicator, an index movable over the face of the dial, a shaft on which the index is mounted extending inwardly from the indicator casing into the casing of the taxi meter, and the main shaft of said taxi meter having a socket in one end thereof receiving the inner end of the indicator shaft in a manner to provide a drive connection between the main shaft of the taxi meter and the indicator shaft for operating the index mechanism with the main shaft of the taxi meter.

2. The combination with a taxi-meter including a main indicator and means for driving the same, of an indicator for indicating the operative or inoperative condition of the taxi-meter and including a casing mounted externally of the taxi-meter, a dial in said casing having a scale thereon graduated in terms of hours, and an index movable over the face of the dial; and motion transmitting means operatively connecting the index with the said driving means for the main indicator.

PAUL RICHARD BRAUN.